United States Patent [19]
Davis et al.

[11] Patent Number: 4,631,614
[45] Date of Patent: Dec. 23, 1986

[54] TAPE CARTRIDGE DRIVE HEAD CLEANER

[75] Inventors: C. Paul Davis, Woodland Hills, Calif.; Eli Neuman, Magdiel, Israel

[73] Assignee: Innovative Computer Products Corporation, Chatsworth, Calif.

[21] Appl. No.: 442,647

[22] Filed: Nov. 18, 1982

[51] Int. Cl.[4] ............................................. G11B 5/41
[52] U.S. Cl. ..................... 360/128; 360/137; 15/210 R
[58] Field of Search ............... 360/128, 137; 15/210 R

[56] References Cited

U.S. PATENT DOCUMENTS

| | | | |
|---|---|---|---|
| 3,761,994 | 10/1973 | Becht | 360/128 |
| 3,783,470 | 1/1974 | Myers et al. | 15/210 R |
| 4,272,796 | 6/1981 | Van Kreuningen et al. | 360/128 |
| 4,458,281 | 7/1984 | Kara | 360/128 |

Primary Examiner—John H. Wolff
Attorney, Agent, or Firm—Spensley Horn Jubas & Lubitz

[57] ABSTRACT

Disclosed is a cleaning cartridge for cleaning the magnetic heads and the scraper of computer tape drives that use tape cartridges and more particularly streamer and start-stop drives. This cleaning cartridge can be inserted into the tape drive and can simultaneously clean the heads and the scraper by rubbing a cleaning pad against the heads and the scraper in a direction that is perpendicular to the tape path. This pad is made from an absorbent material that can be saturated with a cleaning fluid, so the pad will collect foreign particles when it is rubbed against the heads. The cartridge can be manually operated or it can engage the drive mechanism of the tape drive.

11 Claims, 7 Drawing Figures

U.S. Patent  Dec. 23, 1986  Sheet 1 of 2  4,631,614
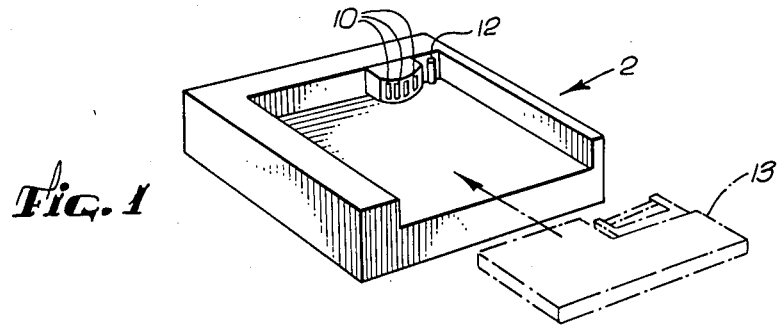
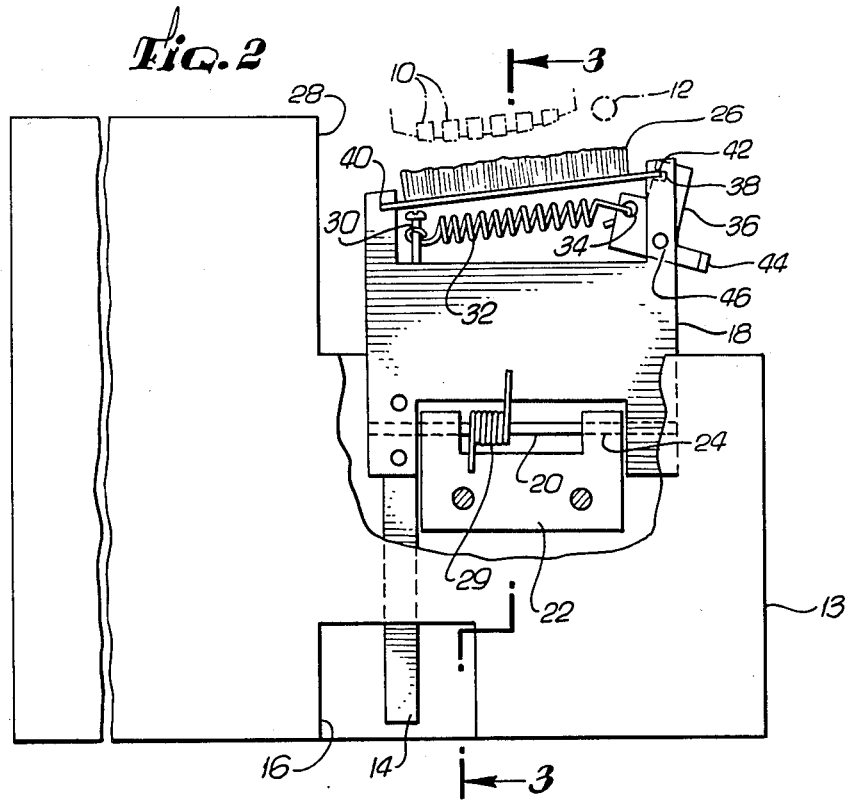
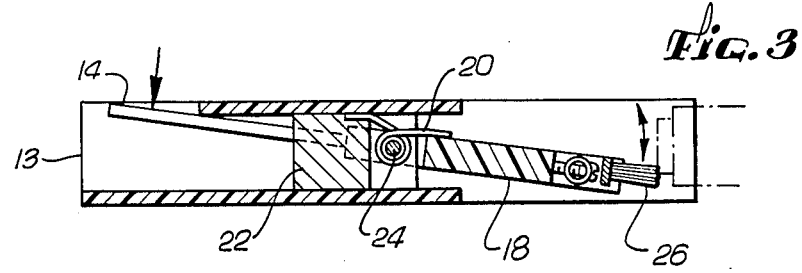

TAPE CARTRIDGE DRIVE HEAD CLEANER

BACKGROUND OF THE INVENTION

1. Field of the Invention

This invention relates to systems for cleaning the magnetic read, write and erase heads of cartridge tape drives and more particularly to tape drives and cartridge tape drives of the type referred to as "streamer" or "streaming" mode and "start-stop" mode drives. Streamer and start-stop drives are typically used as backup data storage for disc drive systems. As with other pieces of data processing equipment, streamer and start-stop drives and other cartridge tape drives require preventive care and periodic maintenance to ensure efficient, smooth and error free operation. Delicate magnetic read, write and erase heads and the tape scraper which are usually found on this equipment must be periodically cleaned, but the cleaning method must not damage the heads. This invention provides a safe, efficient and simple method of simultaneously cleaning all the magnetic heads and the adjacent tape scraper of the tape drive.

2. Description of the Prior Art

Streamer and start-stop drives are a relatively recent development and head cleaner systems for them have not been produced. However, head cleaning devices have been developed for audio cassette and audio cartridge systems.

Audio tape cleaning devices are generally designed to clean only the play head, leaving the other heads of the audio system untouched. The ability to clean all of the heads in computer tape drives is necessary to prevent faulty reading, writing or erasing of information. Such errors could lead to incorrect output data or the failure of the entire computer system that is using the tape drive for storage.

Various cartridge and cassette cleaners are disclosed in U.S. Pat. Nos. 4,141,053 to Kara, 4,149,206 to Loiselle, 4,225,893 to Loiselle, 4,272,796 to Van Kreuningen et. al., 3,761,994 to Becht, 3,783,470 to Myers et. al., and 3,955,214 to Post et. al. Most of these devices use a horizontally pivoting cleaning arm or a rotating pulley and a cleaning pad that is attached to the arm or pulley. The Myers system imparts a sliding motion to a cleaning pad. Thus, these devices use a motion that is parallel to the tape path for the cleaning action and are designed to clean only one magnetic head. Furthermore, this parallel cleaning motion has been found to be ineffective for removing dirt from the corners of the magnetic heads.

U.S. Pat. No. 4,272,796 to Van Kreuningen, et al., discloses a cleaning system which uses a combination of a vertical and a horizontal cleaning motion. This system is also designed to clean only one magnetic head at a time.

The patents issued to Post et. al., Kara, Loiselle and to Van Kreuningen, et. al. are designed to use the transport mechanism of the audio cassette deck to provide the motion of the cleaning pad. Therefore, these designs produce a rapid scrubbing motion across the head. This results in repeated rubbing of the play head. Although this motion should not damage the magnetic heads of a cassette unit, such repeated cleanings could damage the more delicate magnetic heads of computer tape drives. Furthermore, these audio cleaning systems require that power be applied to the cassette deck. It is not always desirable to have power applied to computer tape drives while cleaning their heads.

The cleaning system disclosed in U.S. Pat. No. 4,158,871, to Leaming, which is used for cleaning audio tape cartridge playback units, uses a shaft with a cotton swab or felt pad attached to the end of the shaft. The cartridge is inserted into the playback unit so the pad or swab may be rubbed against the playing head. If too much force is applied to the shaft, the magnetic heads may be damaged.

Other prior art systems use abrasive cleaning pads or belts to rub the playing head to remove accumulated dirt. Repeated usage of abrasive pads or belts can cause damage to the magnetic heads.

It is therefore the object of the present invention to provide a system for simultaneously cleaning all of the heads and the scraper of a cartridge tape drive system without any need for disassembly of the machine.

It is another object of the present invention to provide a head cleaning system which is substantially nonabrasive and ensures that excessive force cannot be applied to the head assembly and thus prevents possible damage to the individual read, write and erase heads.

It is an object of this invention to provide a head cleaning system which does not require that power be applied to the tape drive during the cleaning procedure.

It is a further object of this invention to provide a head cleaning system which uses the drive mechanism of the tape drive to impart the motion to the cleaning pad.

SUMMARY OF THE INVENTION

These and other objects are achieved by providing a head cleaning system which includes a cleaning pad made of foam or any other absorbent material which is substantially saturated with a cleaning solution. The system is capable of cleaning a plurality of heads arranged along a tape path in a single action. The pad is supported by a cleaning pad holder that pivots the pad causing the pad to rub against the magnetic heads in a direction that is perpendicular to the tape path. This perpendicular motion ensures that the entire surface of each head will be cleaned. The pad and the cleaning pad holder fit inside a cartridge substantially similar to those cartridges that ordinarily contain magnetic tape for tape drive systems. The cleaning pad projects through an aperture in a notched corner of the cartridge so that it can simultaneously contact the read, write and erase heads and the scraper of the tape drive unit. The pad is made of an absorbent material, which can be saturated with a cleaning fluid, so when it is rubbed against the head it will remove and collect foreign particles.

Several methods for providing the power to move the cleaning pad may be employed. One method uses a lever arm that is attached to the cleaning pad holder and projects through the top of the cartridge case, whereby downward movement of the lever arm will cause the cleaning pad holder and cleaning pad to pivot in a direction that is perpendicular to the tape path. A second method uses a lever arm that projects through an aperture in the rear of the cartridge and is attached to a cam system. When the lever is displaced in a horizontal direction, the cam system translates the horizontal motion into a motion perpendicular to the tape path, thereby moving the cleaning pad holder and cleaning pad in the perpendicular direction. A third method uses a plurality of gears, which couple with the drive mechanism of the tape drive when the cartridge is inserted into the tape drive. The rotation of the drive mechanism is transmitted through the gears to a cam system to thereby move the cleaning pad in a direction that is perpendicular to the tape path.

BRIEF DESCRIPTION OF THE DRAWINGS

In the drawings, wherein like numbers refer to corresponding components in the several figures:

FIG. 1, is a perspective view of a streamer and start-stop tape drive unit;

FIG. 2 is a top plan view of the tape drive head cleaning cartridge;

FIG. 3 is a section view of the cleaning cartridge taken along line 3—3 of FIG. 2;

DESCRIPTION OF THE PREFERRED EMBODIMENTS

Figure 4:
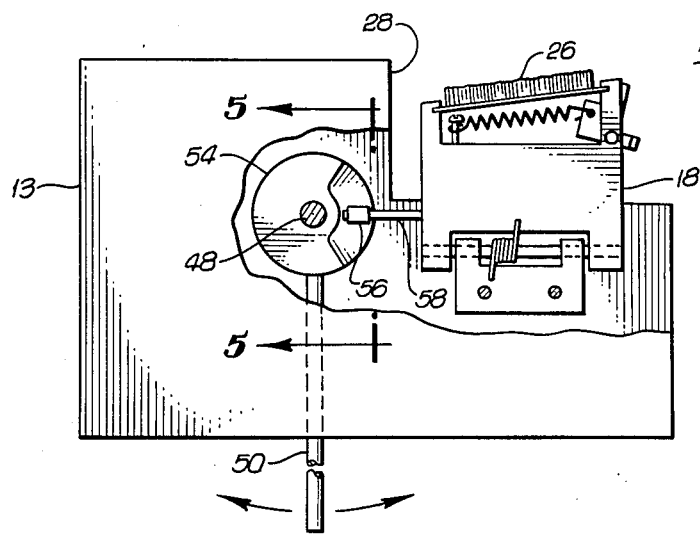
FIG. 4 is a top plan view of an alternate version of the cleaning cartridge.

The following description is the best presently contemplated modes of carrying out the invention. This description is made for the purpose of illustrating the general principles of the invention and is not to be taken in a limiting sense. The scope of the invention is best determined by the appended claims.

FIG. 1 shows a computer tape drive 2 that uses tapes housed inside cartridges. Magnetic read, write and erase heads 10 and a scraper 12 are arranged along the tape path. These heads are generally attached together to form a head assembly, or are manufactured in a single housing to form a single head assembly. The magnetic heads 10 read data stored on the tape, write data onto the tape and erase the tape. The scraper 12 dislodges dirt from the tape as the tape moves past it. Although a magnetic tape cartridge is not shown, reference numeral 13 illustrates a cartridge for housing the cleaning mechanism of the present invention. This cleaning cartridge 13 is similar to those cartridges which ordinarily contain magnetic recording tape for use with the tape drive 2.

FIGS. 2 and 3 show a cartridge 13 that houses the cleaning mechanism and can be inserted into the tape drive shown in FIG. 1. A lever arm 14 projects through an aperture 16 that has been formed in the cartridge 13. The lever arm 14 is tightly fastened to a cleaning pad holder 18 so that a downward movement of the lever arm 14 will pivot the cleaning pad holder 18 about a rod 20. The rod 20 is supported by a support 22 that is fastened to the cartridge 13. Each end of the rod 20 passes through the holes 24 in the support 22 and is connected to the cleaning pad holder 18. The cleaning pad holder 18 projects through an aperture 28 in a notched corner of the cartridge 13, and a cleaning pad 26 is attached to the end of the cleaning pad holder 18 that is opposite from the lever arm 14. The cleaning pad holder 18 and cleaning pad 26 project far enough through the aperture 28 so as to contact the magnetic heads 10 and the scraper 12 of the tape drive system when the unit is inserted into the tape drive. Because the cleaning pad holder 18 pivots about the rod 20, the cleaning pad 26 will move in a direction that is perpendicular to the tape path, rubbing against the heads 10 and the scraper 12 whenever the lever arm 14 is pushed down. A spring 29 biases the cleaning pad holder 18 to cause it to pivot back about the rod 20 once the lever arm 14 is released. During this return motion, the cleaning pad 26 will again rub the magnetic heads 10 and the scraper 12.

FIG. 2 shows the detailed structure of the cleaning pad holder 18 that secures the cleaning pad 26. A post 30 is attached to one end of a spring 32 and the other end of the spring 32 passes through a hole 34 in a latch 36. The latch 36 has a slot 38 which is oriented in a vertical direction. When the latch 36 is in the usual operating position, the spring 32 biases the latch 36 to a closed position to secure the pad 26 in the vertically oriented slots 40 and 42 at the ends of the cleaning pad holder 18. Pressing down on a latch release 44 that is attached to the latch 36 causes the latch 36 to pivot about a latch pin 46 that is attached to the cleaning pad holder 18. The cleaning pad 26 can then be slid out of the slots 40 and 42 and a new cleaning pad 26 can be inserted. When the force on the latch release 44 is removed, the spring 32 will bias the latch 36 to clamp the cleaning pad in the operating position.

The cleaning pad 26 is made of a soft and absorbent material bonded to an elastic backing strip made of metal or plastic. Contaminants and debris are rubbed off of the heads and trapped and held by the soft and absorbent cleaning pad surface. The pad 26 should be absorbent so it can be saturated with a cleaning fluid. Preferably, the pad is made from a material having a white or other light color material, so an operator may easily tell when the pad 26 needs replacement by checking it for discoloration. The cleaning pad 26 should be relatively resistant to wear so that it will not deteriorate during cleaning. In the preferred embodiment, the cleaning pad is made of polyurethane foam or lint free absorbent fabric or a combination of foam and lint free absorbent fabric, which is soft, porous and non-abrasive. It is an effective cleaner which removes oils, dust, oxide and other contaminants.

Many types of cleaning solutions may be used to saturate the cleaning pad 26. For example, isopropyl alcohol or a mixture of isopropyl alcohol and a flurocarbon (e.g., Freon) can be utilized. Any solution may be employed that has solvent properties dissolving common contaminants found on heads and does not leave a residue on the heads or damage the heads on the head assembly.

Figure 5:
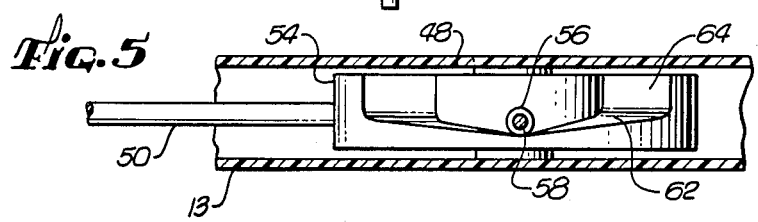
FIG. 5 is a section view of the cleaning cartridge taken along line 5—5 of FIG. 4.

FIG. 4 shows an alternative embodiment of the cleaning system. This embodiment employs a cam system, which is rotated by horizontal movement of a lever arm to move the cleaning pad in a direction that is perpendicular to the tape path. Identical numbers are used to identify those components that are common to the version shown in FIG. 2. The cartridge 13 houses the mechanism for moving the cleaning pad 26 and cleaning pad holder 18. An aperture 28 in a notched corner of the cartridge 13 exposes the cleaning pad 26 and the cleaning pad holder 18. A cam 54 is rotatably supported by this axle 48 inside the cartridge 13. A cam lever 50 that is attached to the side of cam 54 is accessible to the operator. Horizontal movement of the cam lever 50 pivots the cam 54 causing a cam follower 56 that couples with the surface of the cam 54 to move in a vertical direction. The surface the of cam 54 is sloped, as shown in FIG. 5, and the motion of the cam will cause the cam follower to be displaced vertically. The cam follower 56 is attached to the cam follower shaft 58 which in turn is attached to the cleaning pad holder 18. Because the cam follower is attached to the cleaning pad holder 18 by the cam follower shaft 58, the cleaning pad holder 18 will move vertically with the cam follower 58. This moves the cleaning pad 26 in a direction perpendicular to the tape path.

FIG. 5 shows the structure of the cam 54 which imparts the vertical motion to cam follower 56. The cam 54 is manufactured to form an inclined plane 62. Two stops 64 are included to prevent the cam follower from riding over the top of the cam 54 and jamming against the surface of the cartridge 13. Therefore, as the cam 54 pivots, the inclined surface of the cam will move the cam follower 56 in a vertical direction.

Figure 6:
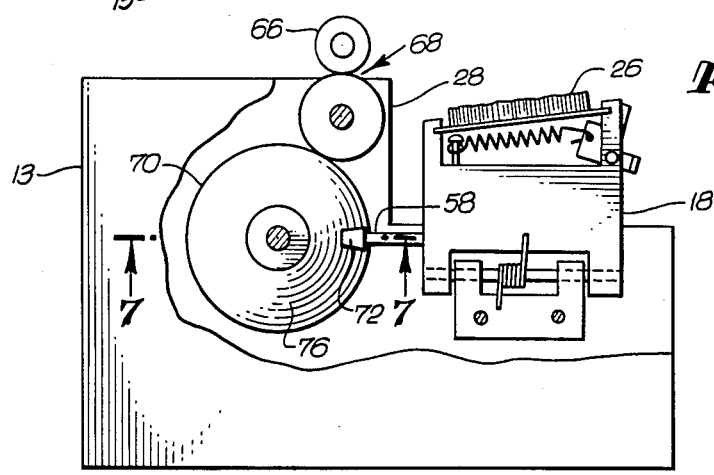
FIG. 6 is a top plan view of an alternative embodiment that uses the tape drive mechanism to operate the cleaning device.
Figure 7:
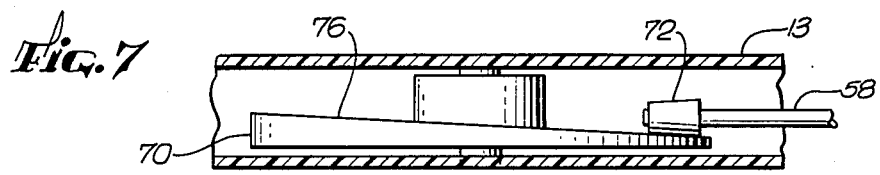
FIG. 7 is a section view of the cleaning cartridge taken along line 7—7 of FIG. 6.

FIG. 6 shows an alternative design that uses the motive power of the tape drive to impart the vertical motion to the cleaning pad holder 18 and the cleaning pad 26. Identical numbers are used to identify the components that are common to the versions shown in FIGS. 2 and 5. The drive pulley 66 of the tape drive couples with a pulley 68 that projects through an aperture in the cartridge 13, causing the pulley 68 to rotate when the drive pulley 66 rotates. When the pulley 68 rotates, it in turn rotates a cam 70 that has an inclined plane for a top surface 76 (FIG. 7) so that the cam follower 72 will be displaced vertically. The cam follower 72 is connected to the cleaning pad holder 18 by the cam follow shaft 58. The ratio of the radii of the drive pulley 66, the driven pulley 68 and the cam 70 is such that the cam 70 will have a much lower rate of rotation than the drive pulley 66. Thus, the cleaning pad holder 18 and the cleaning pad 26 will have a relatively slow rate of rotation, ensuring that the pad will not rub against the heads often enough to damage the heads.

In summary, the present invention provides a system which permits convenient simultaneous cleaning of the magnetic heads and scraper of a tape drive system by a cleaning pad that is moved perpendicularly to the tape path. This is facilitated by using a cartridge enclosing a mechanism that permits a material that has been saturated with a cleaning solution to be rubbed in a vertical direction against the magnetic heads in the scraper. The vertical motion is provided by employing a pivoting arm to which a cleaning pad is attached. Either manual or powered operation can be provided.

I claim:

1. A cleaning cartridge for use with cartridge tape drive systems having a plurality of magnetic heads arranged along a tape path, comprising:
   a cartridge that is adapted for insertion into the drive system and includes an opening that is adjacent to the heads when the cartridge is inserted into the drive system;
   a cleaning pad supported in the area of the opening, wherein the pad is adapted for contacting each of the heads when the cartridge is inserted into the drive system; and
   actuator means secured within the cartridge for moving the cleaning pad in a direction that is substantially perpendicular to the tape path thereby causing the cleaning pad to simultaneously clean the heads.

2. A cleaning cartridge as described in claim 1, wherein the tape drive has a tape scraper arranged along the tape path and wherein the cleaning pad is configured to abut the magnetic heads and the scraper of the tape drive when the cartridge is inserted into the tape drive, whereby the scraper will be cleaned in the same manner as the heads.

3. A cleaning cartridge as described in claim 2, wherein the actuator means for moving the cleaning pad are adapted to manually operate and include means for translating an actuating motion parallel to the tape path into the perpendicular movement of the cleaning pad.

4. A cleaning cartridge as described in claim 3 further comprising:
   a cam disk of a variable thickness and having a central axis, with the cam disk rotatably secured within the cartridge along the central axis, said disk having a cam surface on the top thereof;
   a lever arm attached to the edge of the disk, wherein the arm is accessible to an operator, and movement of the arm imparts rotation to the disk;
   a cam follower which cooperates with the cam surface of the cam disk; and
   a cleaning pad holder which is coupled to the cam follower and supports the cleaning pad, whereby movement of the lever arm will impart motion to the cleaning pad.

5. A cleaning cartridge as described in claim 2 wherein the actuator means is adapted to manually operate by application of a force in a direction perpendicular to the tape path.

6. A cleaning cartridge as described in claim 5 wherein the actuator means comprises:
   a lever arm supported within the cartridge, wherein the arm is accessible to an operator and is pivoted about an axis parallel to the tape path;
   a cleaning pad holder attached to the lever arm, wherein the cleaning pad is secured to the cleaning pad holder; and
   means for supporting the lever arm at the pivot point whereby a downward force on the lever arm causes the cleaning pad holder to pivot about the axis, causing the motion of the cleaning pad.

7. A cleaning cartridge as described in claim 6, further including spring bias means for forcing the lever arm to a fixed position, wherein application of force to the lever arm overcomes the force of the bias means.

8. A cleaning cartridge as described in claim 1, wherein the tape drive system has a drive mechanism and wherein the actuator means of the cartridge coupled with the drive mechanism of the tape drive, wherein movement of the drive mechanism imparts motion to the cleaning pad.

9. A cleaning cartridge as described in claim 8 further comprising:
   a cam disk of a variable thickness and having a central axis with the cam disk rotatably supported within the cartridge along the central axis and operatively coupled to the drive mechanism to be rotated thereby, said cam disk including a cam surface;
   a cam follower which is biased against the cam surface of the cam disk, whereby the follower is displaced vertically when the disk is rotated; and
   a cleaning pad holder, which is coupled to the cam follower and supports the cleaning pad.

10. A cleaning cartridge as described in claim 1, further including a cleaning pad holder for securing the cleaning pad in place, said holder including a means for releasing the pad from the cleaning pad holder whereby the pad may be replaced.

11. A cleaning cartridge as described in claim 10, wherein the cleaning pad is made of a porous material which can be saturated with a cleaning fluid, wherein the cleaning pad holder comprises:
a rectangular body having two arms projecting out from adjacent corners, each arm including a slot at the tip thereof for holding the cleaning pad;
a latch adjacent to the cleaning pad holder;

spring means for biasing the latch to secure the cleaning pad in the cleaning pad holder; and
a latch release which is attached to the latch, wherein pressure applied to the latch release will cause the latch move out of contact with the cleaning pad.

* * * * *